(12) United States Patent
Nishino et al.

(10) Patent No.: US 8,467,575 B2
(45) Date of Patent: Jun. 18, 2013

(54) MOVING-OBJECT DETECTION APPARATUS, MOVING-OBJECT DETECTION METHOD AND MOVING-OBJECT DETECTION PROGRAM

(75) Inventors: Katsuaki Nishino, Kanagawa (JP); Nobuhiro Tsunashima, Kanagawa (JP)

(73) Assignee: Sony Corporation (JP)

( * ) Notice: Subject to any disclaimer, the term of this patent is extended or adjusted under 35 U.S.C. 154(b) by 149 days.

(21) Appl. No.: 12/932,545

(22) Filed: Feb. 28, 2011

(65) Prior Publication Data
US 2011/0228979 A1 Sep. 22, 2011

(30) Foreign Application Priority Data
Mar. 16, 2010 (JP) .................. P2010-059116

(51) Int. Cl.
*G06K 9/00* (2006.01)
*H04N 5/225* (2006.01)

(52) U.S. Cl.
USPC .......................................... 382/103; 348/169

(58) Field of Classification Search
USPC .................. 382/103, 107, 236; 348/169–172, 348/208.1, 208.2, 208.16, 352
See application file for complete search history.

(56) References Cited

U.S. PATENT DOCUMENTS

| 7,586,400 B2 * | 9/2009 | Nagaoka et al. ............ 340/425.5 |
| 7,925,051 B2 * | 4/2011 | Gensolen et al. ............. 382/107 |
| 8,319,898 B2 * | 11/2012 | Ueno et al. .................... 348/625 |
| 2006/0056702 A1 | 3/2006 | Tsunashima |

FOREIGN PATENT DOCUMENTS

| JP | 2006-107457 A | 4/2006 |
| JP | 2007-102556 A | 4/2007 |

* cited by examiner

*Primary Examiner* — Abolfazl Tabatabai
(74) *Attorney, Agent, or Firm* — Lerner, David, Littenberg, Krumholz & Mentlik, LLP

(57) ABSTRACT

Disclosed herein is a moving-object detection apparatus having a plurality of moving-object detection processing devices configured to detect a moving object on the basis of a motion vector computed by making use of a present image and a past image wherein the moving-object detection processing devices are set to operate differently from each other in at least one of the resolution of the present and past images, the time distance between the present and past images and the search area of the motion vector in order to detect the moving object.

9 Claims, 15 Drawing Sheets

FIG.7A  t0
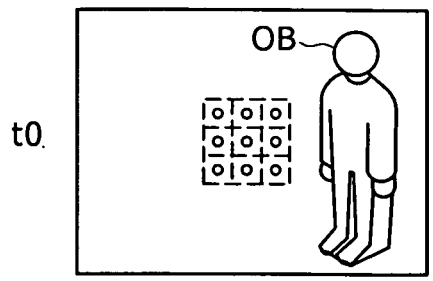
FIG.7B  t1
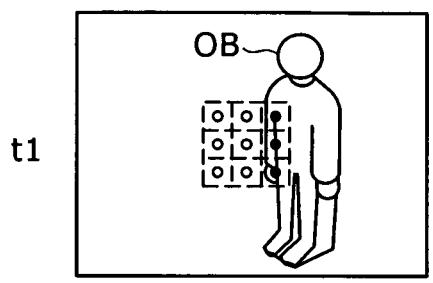
FIG.7C  t2
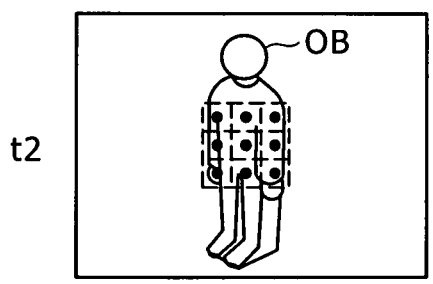
FIG.7D  t3
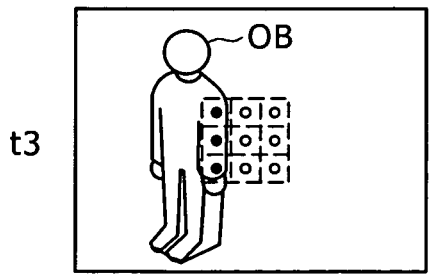
FIG.7E  t4
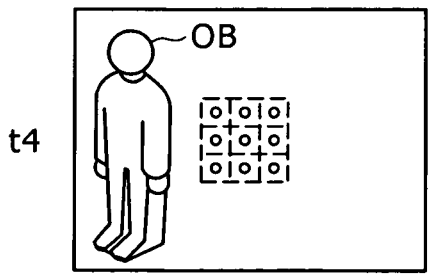

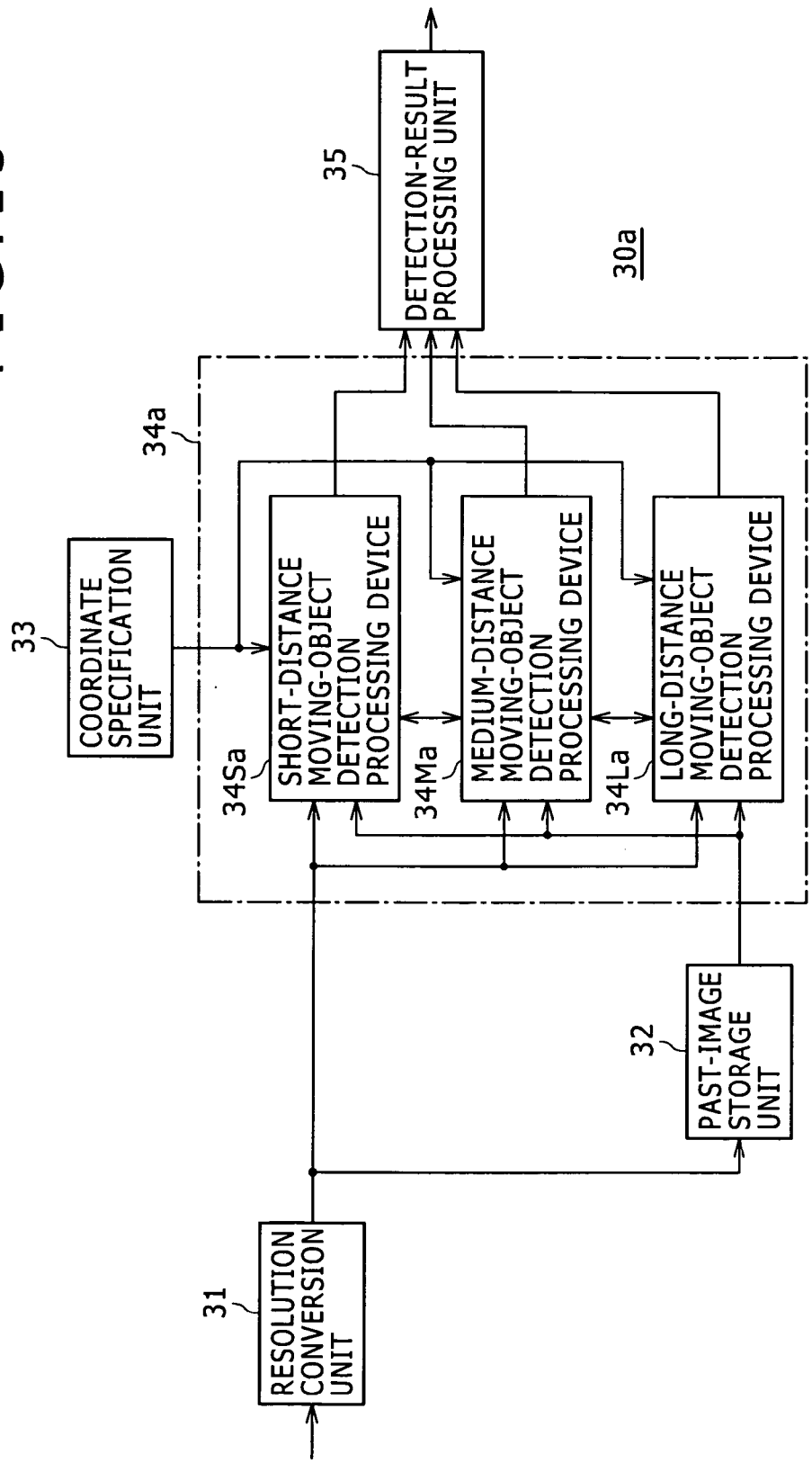

MOVING-OBJECT DETECTION APPARATUS, MOVING-OBJECT DETECTION METHOD AND MOVING-OBJECT DETECTION PROGRAM

CROSS-REFERENCE TO RELATED APPLICATION

The present application claims priority from Japanese Patent Application No. JP 2010-059116 filed in the Japanese Patent Office on Mar. 16, 2010, the entire content of which is incorporated herein by reference.

BACKGROUND OF THE INVENTION

1. Field of the Invention

The present invention relates to a moving-object detection apparatus, a moving-object detection method and a moving-object detection program. To put it in detail, the present invention relates to a moving-object detection apparatus capable of detecting a moving object in a stable manner with no regard to the positional distance between the moving object and the apparatus as well as the movement velocity of the moving object, relates to a moving-object detection method adopted by the apparatus and relates to a moving-object detection program implementing the method.

2. Description of the Related Art

An intrusion detection system of a known monitoring camera detects a moving object. For example, in accordance with the technology disclosed in Japanese Patent Laid-open No. 2007-102556, taken image data is divided into a plurality of area blocks. In addition, for smoothed image data of image area blocks, the presence (or the absence) of a state change is detected. A map of currently detected state-change presence/absence blocks is compared with a map of a previously detected state-change presence/absence blocks and the number of difference generating blocks accompanying movements of the state-changes presence blocks is counted. If the number of difference generating blocks accompanying the movements of the state-changes presence blocks is greater than a value determined in advance, a movement is determined to have been detected.

In addition, in accordance with the technology disclosed in Japanese Patent Laid-open No. 2006-107457, data of a plurality of images taken in the past is stored as reference image data. Then, the reference image data which is the stored data of images taken in the past is compared with currently taken image data in order to detect a difference for each pixel or each small area. Subsequently, a moving object in the image data is detected on the basis of the contiguity (or the appearability) of the detected differences.

SUMMARY OF THE INVENTION

By the way, if a movement is determined to have been detected as evidenced by the fact that the number of difference generating blocks accompanying movements of state-changes presence blocks is greater than a value determined in advance, it is feared that, for a long positional distance between the moving object and the moving-object detection apparatus, the precision of the movement detection deteriorates. That is to say, for a long positional distance between the moving object and the moving-object detection apparatus, the size of the image of the moving object on the taken image is small. Thus, for a long positional distance between the moving object and the moving-object detection apparatus, the number of difference generating blocks does not increase so that a movement cannot be detected.

In addition, also for a case in which the reference image data is compared with the currently taken image data in order to detect a difference for each pixel or each small area and, subsequently, a moving object in the image data is detected on the basis of the contiguity (and/or the appearability) of the detected differences, the contiguity (and/or the appearability) of the detected differences much vary in accordance with whether the positional distance between the moving object and the moving-object detection apparatus is short or long. Thus, it is feared that the precision of the moving-object detection much varies in accordance with whether the positional distance between the moving object and the moving-object detection apparatus is short or long.

It is thus an object of the present invention to provide a moving-object detection apparatus capable of detecting a moving object in a stable manner with no regard to the positional distance between the moving object and the apparatus as well as the movement velocity of the moving object, provide to a moving-object detection method adopted by the apparatus and provide to a moving-object detection program implementing the method.

In accordance with a first embodiment of the present invention, there is provided a moving-object detection apparatus having a plurality of moving-object detection processing devices configured to detect a moving object on the basis of a motion vector computed by making use of a present image and a past image. In order for the moving-object detection apparatus to detect the moving object, the moving-object detection processing devices are set to operate differently from each other in at least one of the resolution of the present and past images, the time distance between the present and past images and the search area of the motion vector.

Each of the moving-object detection processing devices selects a position having a movement distance equal to or longer than a value determined in advance from a plurality of specified positions and takes the selected position as a feature point. Then, tracking processing is carried out to determine a point to which the feature point has moved with the lapse of time. From the results of the tracking processing, an unnecessary feature point is determined as a feature point to be deleted by making use of a predetermined determination criterion which is at least one of the movement direction of the feature point, the movement velocity of the feature point, the position of the feature point and the tracking period. Then, remaining feature points are used as a basis for determining whether or not a moving object has been detected.

In addition, in any specific one of the moving-object detection processing devices, a search area of the motion vector is set also on the basis of information set for moving-object detection processing carried out by the other ones of the moving-object detection processing devices. In this way, it is possible to reduce the number of cases in which a moving object detected by another moving-object detection processing device is redundantly detected by the specific moving-object detection processing device.

In accordance with a second embodiment of the present invention, there is provided a moving-object detection method for a moving-object detection apparatus having a plurality of moving-object detection processing devices. The moving-object detection method has moving-object detection steps each to be carried out by one of the moving-object detection processing devices to detect a moving object on the basis of a motion vector computed by making use of a present image and a past image. In order for the moving-object detection apparatus to detect the moving object, the moving-object detection processing devices are set to carry out their respective moving-object detection steps differently from each other in at least one of the resolution of the present and past images, the time distance between the present and past images and the search area of the motion vector.

In accordance with a third embodiment of the present invention, there is provided a moving-object detection program executed by a computer as a program for driving the computer to function as a plurality of moving-object detection functional means for detecting a moving object on the basis of a motion vector computed by making use of a present image and a past image. In order for the computer driven by the moving-object detection program to detect the moving object, the moving-object detection functional means are set to operate differently from each other in at least one of the resolution of the present and past images, the time distance between the present and past images and the search area of the motion vector.

It is to be noted that the moving-object detection program according to the embodiments of the present invention is provided in a computer-readable form that can be read by a general-computer system typically capable of executing a variety of program codes to serve as the moving-object detection apparatus. The moving-object detection program is usually stored in advance in a removable recording medium to be provided to the general-computer system also referred to hereafter simply as a computer system. Typical examples of the removable recording medium are an optical disc, a magnetic disc and a semiconductor memory. As an alternative, the moving-object detection program is downloaded from a program provider at a download site to the general-computer system through a communication medium such as a network. By providing the moving-object detection program to the general-computer system in the computer-readable form, the general-computer system is capable of executing the program in order to carry out various kinds of processing.

In accordance with the present invention, a plurality of moving-object detection processing devices employed in a moving-object detection apparatus detect a moving object on the basis of a motion vector computed by making use of a present image and a past image. In order for the moving-object detection apparatus to detect the moving object, the moving-object detection processing devices are set to operate differently from each other in at least one of the resolution of the present and past images, the time distance between the present and past images and the search area of the motion vector. Thus, the moving-object detection processing devices are capable of detecting a moving object in a stable manner with no regard to the positional distance between the moving object and the apparatus as well as the movement velocity of the moving object

BRIEF DESCRIPTION OF THE DRAWINGS

FIGS. 7A through 7E are a plurality of diagrams showing typical feature points for a case in which a moving object is included in an image;

FIG. 13 is a block diagram showing the configuration of a moving-object detection section which is another moving-object detection section;

DETAILED DESCRIPTION OF THE PREFERRED EMBODIMENTS

Figure 1:
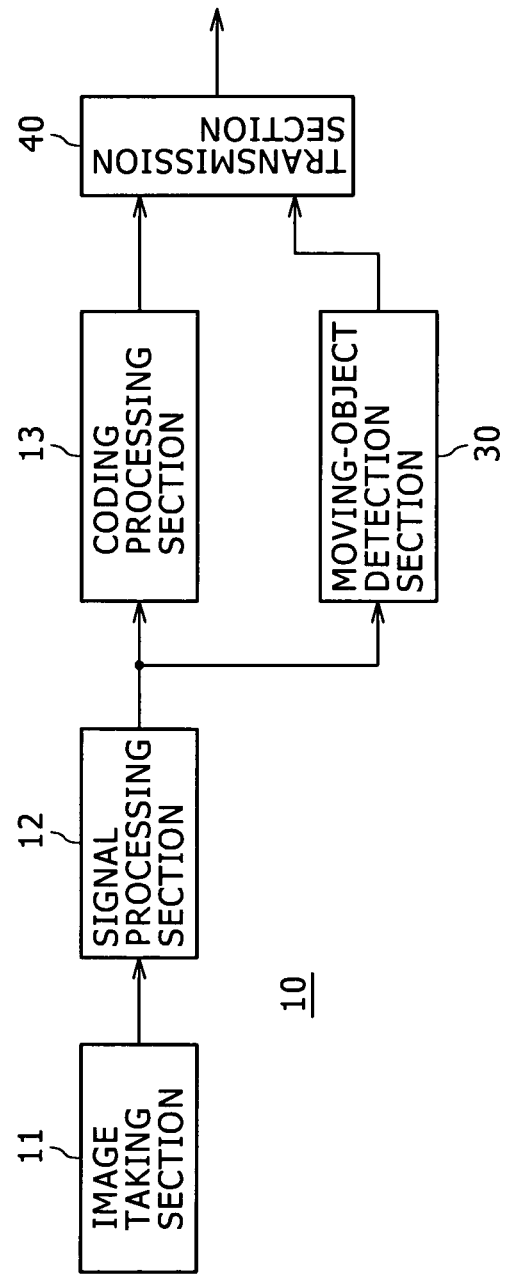
FIG. 1 is a functional block diagram showing the configuration of an image taking apparatus designed as a moving-object detection apparatus.

Embodiments of the present invention are explained as follows. A moving-object detection apparatus according to the present invention is provided with a plurality of moving-object detection processing devices for detecting a moving object. The moving-object detection processing devices are set to operate differently from each other in at least one of the resolution of the present and past images, the time distance between the present and past images and the search area of the motion vector so that the moving object can be detected in a stable manner with no regard to the positional distance between the moving object and the apparatus as well as the movement velocity of the moving object. It is to be noted that the embodiments are described in chapters arranged as follows:

1: First Embodiment
   1-1: Configuration of the Moving-Object Detection Apparatus
   1-2: Moving-Object Detection Method
2: Second Embodiment
   2-1: Other Configuration of the Moving-Object Detection Section
   2-2: Moving-Object Detection Method
3: Configuration for Carrying Out Software Processing for Moving-Object Detection 1: First Embodiment 1-1: Configuration of the Moving-Object Detection Apparatus FIG. 1 is a functional block diagram showing the configuration of an image taking apparatus 10 designed as a moving-object detection apparatus. The image taking apparatus employs an image taking section 11, a signal processing section 12, a coding processing section 13, a moving-object detection section 30 and a transmission section 40.

The image taking section 11 is configured to make use of a solid-state image taking device such as a CCD (Charge Coupled Device) image sensor or a CMOS (Complementary Metal Oxide Semiconductor) image sensor. The image taking section 11 takes an image of typically a monitoring-object area and outputs an image signal representing the image to the signal processing section 12.

The signal processing section 12 carries out various kinds of processing on the image signal received from the image taking section 11. The processing includes elimination of noises, color processing and compression to a proper gradation.

The coding processing section 13 carries out image-signal compression processing by adoption of a coding method determined in advance on an image signal obtained as a result of the processing carried out by the signal processing section 12. Typical examples of the coding method are the JPEG (Joint Photographic Experts Group) method and the MPEG4 (Moving Picture Experts Group phase 4) method. The coding processing section 13 outputs a coded signal obtained as a result of the coding processing to the transmission section 40.

The moving-object detection section 30 carries out a moving-object detection process based on the image signal obtained as a result of the processing carried out by the signal processing section 12. The moving-object detection section 30 outputs a signal obtained as a result of the moving-object detection process to the transmission section 40.

The transmission section 40 supplies the signal obtained as a result of the moving-object detection process carried out by the moving-object detection section 30 and the coded signal obtained as a result of the coding processing carried out by the coding processing section 13 to an external apparatus such as a monitoring control apparatus, which carries out monitoring control, by way of a network.

Figure 2:
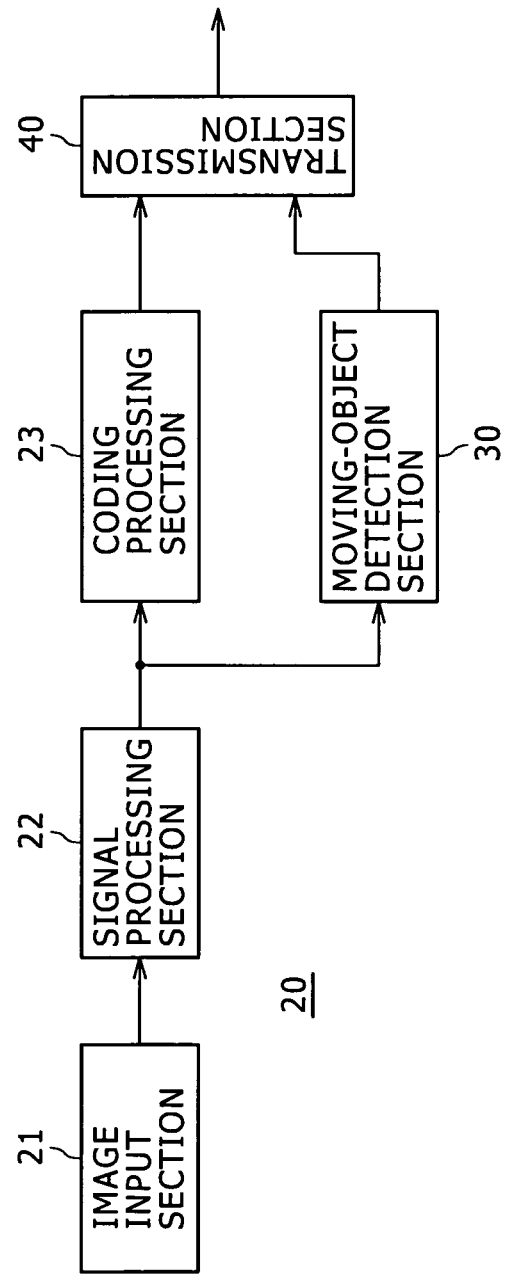
FIG. 2 is a functional block diagram showing the configuration of an image processing apparatus designed to operate in conjunction with a camera head section as a moving-object detection apparatus.

FIG. 2 is a functional block diagram showing the configuration of an image processing apparatus 20 designed to operate in conjunction with a camera head section as a moving-object detection apparatus. The image processing apparatus 20 employs an image taking section 21, a signal processing section 22, a coding processing section 23, a moving-object detection section 30 and a transmission section 40.

The image taking section 21 is an interface connecting the image processing apparatus 20 to the camera head section not shown in FIG. 2. Typically, the image taking section 21 receives an analog image signal from the camera head section. In this case, the image taking section 21 carries out conversion processing to convert the analog image signal into a digital image signal and outputs the digital image signal to the signal processing section 22.

The signal processing section 22 carries out various kinds of processing on the image signal received from the image taking section 21. The processing includes elimination of noises, color processing and compression to a proper gradation.

The coding processing section 23 carries out image-signal compression processing by adoption of a coding method determined in advance on an image signal obtained as a result of the processing carried out by the signal processing section 22. Typical examples of the coding method are the JPEG method and the MPEG4 method. The coding processing section 23 outputs a coded signal obtained as a result of the coding processing to the transmission section 40.

The moving-object detection section 30 carries out a moving-object detection process based on the image signal obtained as a result of the processing carried out by the signal processing section 22. The moving-object detection section 30 outputs a signal obtained as a result of the moving-object detection process to the transmission section 40.

The transmission section 40 supplies the signal obtained as a result of the moving-object detection process carried out by the moving-object detection section 30 and the coded signal obtained as a result of the coding processing carried out by the coding processing section 23 to an external apparatus such as a monitoring control apparatus, which carries out monitoring control, by way of a network.

Figure 3:
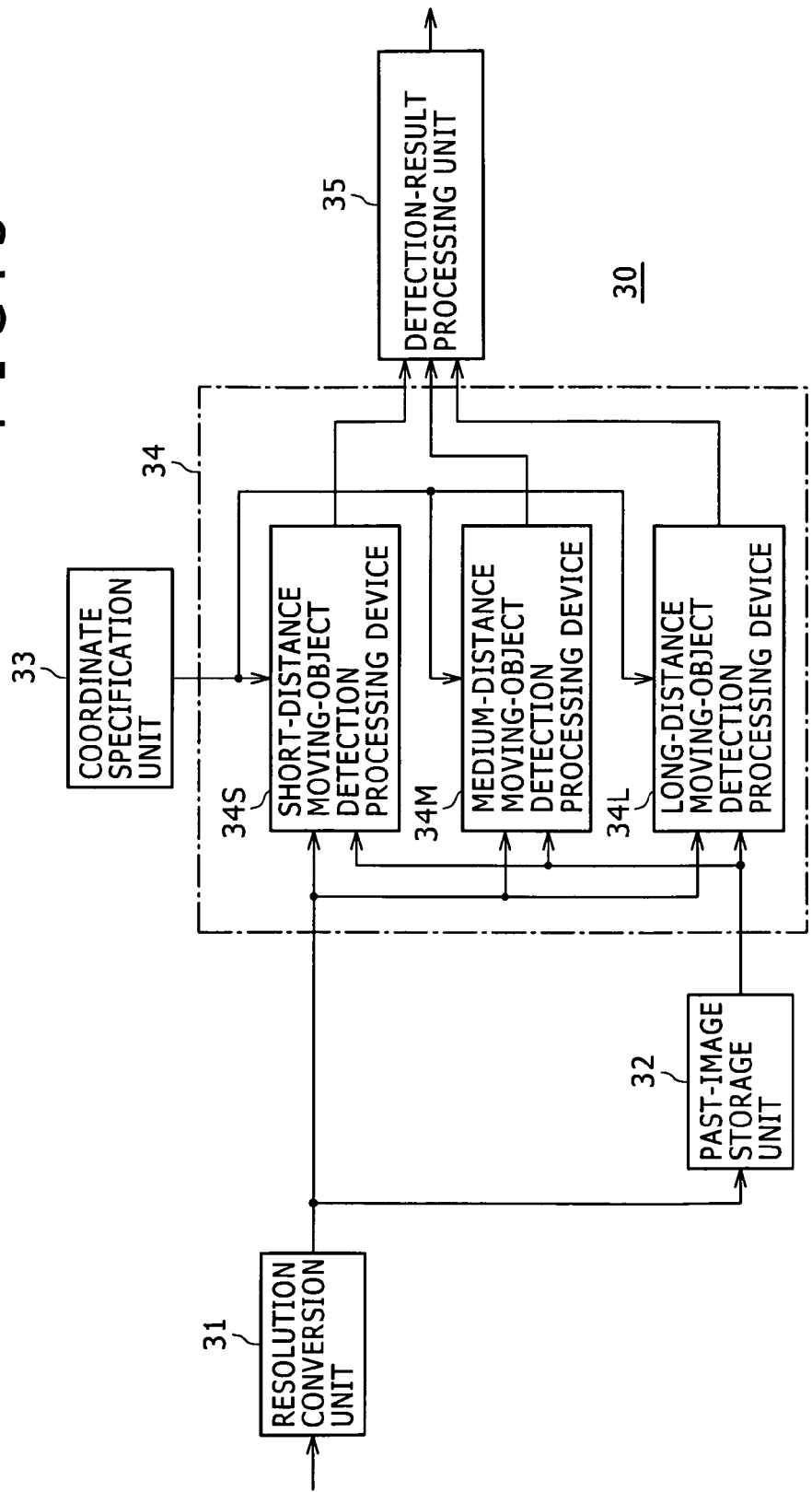
FIG. 3 is a block diagram showing the configuration of a moving-object detection section.

FIG. 3 is a block diagram showing the configuration of the moving-object detection section 30. The moving-object detection section 30 employs a resolution conversion unit 31, a past-image storage unit 32, a coordinate specification unit 33, a detection processing unit 34 and a detection-result processing unit 35.

The resolution conversion unit 31 carries out a resolution conversion process by making use of an image signal received from the signal processing section 12 or 22 in order to generate an image signal of an image having a low resolution and an image signal of an image having a high resolution. To put it in detail, if the image signal received from the signal processing section 12 or 22 is an image signal of an image having a low resolution for example, the resolution conversion unit 31 carries out the resolution conversion process in order to generate an image signal of an image having a high resolution. If the image signal received from the signal processing section 12 or 22 is an image signal of an image having a high resolution, on the other hand, the resolution conversion unit 31 carries out the resolution conversion process in order to generate an image signal of an image having a low resolution. The resolution conversion unit supplies the image signal of an image having a low resolution to the past-image storage unit 32 and a short-distance moving-object detection processing device 34S employed in the detection processing unit 34. On the other hand, the resolution conversion unit 31 supplies the image signal of an image having a high resolution to the past-image storage unit 32 as well as a medium-distance moving-object detection processing device 34M and a long-distance moving-object detection processing device 34L which are employed in the detection processing unit 34.

The past-image storage unit 32 stores the image signal received from the resolution conversion unit 31 in a memory. The past-image storage unit 32 supplies the image signal stored in the memory to the short-distance moving-object detection processing device 34S, the medium-distance moving-object detection processing device 34M and the long-distance moving-object detection processing device 34L. The image signal supplied by the past-image storage unit 32 to the short-distance moving-object detection processing device 34S, the medium-distance moving-object detection processing device 34M and the long-distance moving-object detection processing device 34L represents a past image taken earlier than the present image represented by an image signal supplied by the resolution conversion unit 31 to the short-distance moving-object detection processing device 34S, the medium-distance moving-object detection processing device 34M and the long-distance moving-object detection processing device 34L respectively. In addition, the past-image storage unit 32 updates past-image signals stored in the memory with an image signal received from the resolution conversion unit 31 by deleting the earliest past-image signal stored in the memory. That is to say, in the memory, the past-image storage unit 32 holds image signals representing the present image and past images up to an image signal representing a past image leading ahead of the present image represented by the present-image signal, which is received from the resolution conversion unit 31, by a predetermined period of time. In the following description, for the sake of simplicity, an image signal stored in the memory of the past-image storage unit 32 as a signal representing a past image is also referred to simply as a past-image signal whereas an image signal output by the resolution conversion unit 31 as a signal representing a past image is also referred to simply as a present-image signal.

In accordance with an operation carried out by the user, the coordinate specification unit 33 sets a position to be subjected to moving-object detection processing carried out by the detection processing unit 34. To put it concretely, the coordinate specification unit 33 supplies a position specified by the user to the detection processing unit 34 as the so-called moving-object detection position.

The detection processing unit 34 has a plurality of moving-object detection processing devices for carrying out the moving-object detection processing by making use of the present image and a past image. The moving-object detection processing devices have the same configuration shown in FIG. 4. The moving-object detection processing devices are set to operate differently from each other in at least one of the resolution of the present and past images, the time distance between the present and past images and the search area of the motion vector. That is to say, the moving-object detection characteristics of the moving-object detection processing devices are deliberately made different from each other so that any one of the moving-object detection processing devices is capable of detecting a moving object with no regard to the positional distance between the moving-object detection apparatus and the moving object.

For example, the detection processing unit 34 employs the short-distance moving-object detection processing device 34S, the medium-distance moving-object detection processing device 34M and the long-distance moving-object detection processing device 34L to serve as a plurality of moving-object detection processing devices cited above. Each of the short-distance moving-object detection processing device 34S, the medium-distance moving-object detection processing device 34M and the long-distance moving-object detection processing device 34L carries out the moving-object detection processing by making use of a past-image signal stored in the past-image storage unit 32 and the present-image signal output by the resolution conversion unit 31. The short-distance moving-object detection processing device 34S sets moving-object detection for allowing a close moving object close to the moving-object detection apparatus to be detected. The long-distance moving-object detection processing device 34L sets moving-object detection for allowing a far moving object far away from the moving-object detection apparatus to be detected. The medium-distance moving-object detection processing device 34M sets moving-object detection for allowing a medium moving object located at a position between the close moving object detected by the short-distance moving-object detection processing device 34S and the far moving object detected by the long-distance moving-object detection processing device 34L to be detected. In addition, each of the short-distance moving-object detection processing device 34S, the medium-distance moving-object detection processing device 34M and the long-distance moving-object detection processing device 34L carries out the moving-object detection processing at a position specified by the coordinate specification unit 33.

Figure 4:
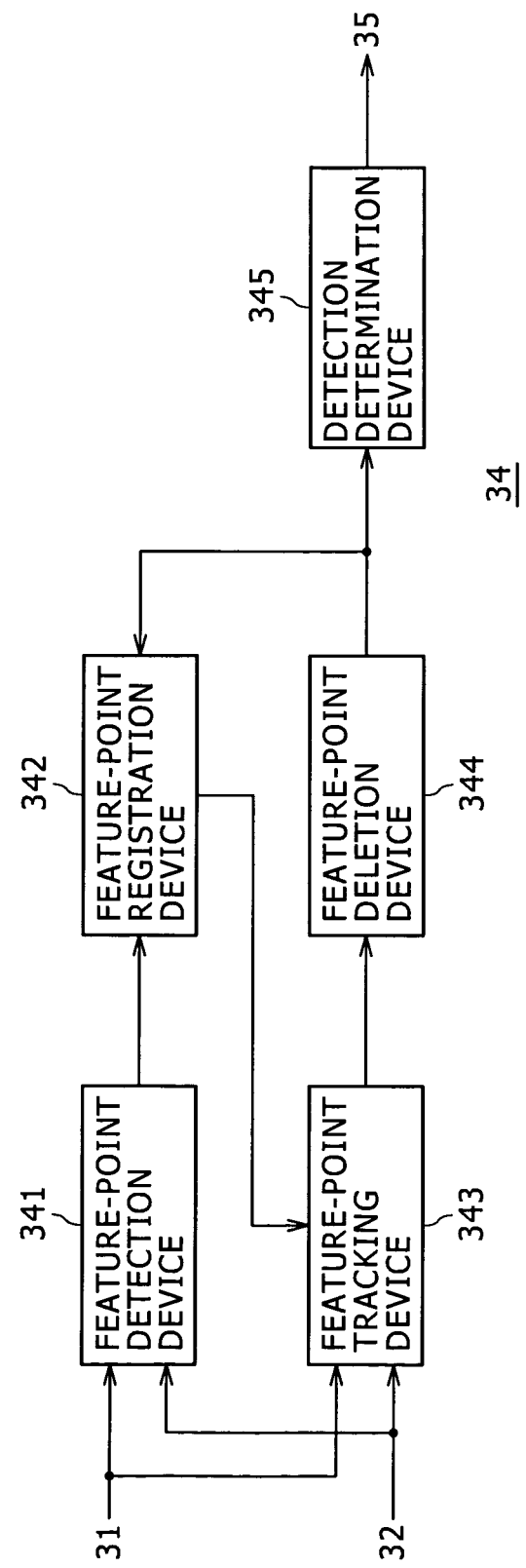
FIG. 4 is a block diagram showing the configuration of a moving-object detection processing unit.

FIG. 4 is a block diagram showing the configuration of a moving-object detection processing device. The moving-object detection processing device employs a feature-point detection device 341, a feature-point registration device 342, a feature-point tracking device 343, a feature-point deletion device 344 and a detection determination device 345.

The feature-point detection device 341 carries out processing to detect a feature point and registers the detected feature point in the feature-point registration device 342. To put it in detail, the feature-point detection device 341 computes a motion vector representing a movement distance at each of a plurality of positions specified in advance. Then, the feature-point detection device 341 detects each position having a movement distance equal to or longer than a value determined in advance and registers the detected position in the feature-point registration device 342 as a feature point. In addition, if the movement distance of the specified position is shorter than the value determined in advance, the feature-point detection device 341 does not register the specified position as a feature point. This is because it is quite within the bounds of possibility that the specified position is a static point.

The feature-point registration device 342 registers a feature point detected by the feature-point detection device 341 on a list of feature points. In addition, the feature-point registration device 342 deletes a feature point, which is specified by the feature-point deletion device 344 to be described later, from the list of registered feature points.

The feature-point tracking device 343 carries out tracking processing for a feature point registered in the feature-point registration device 342. The tracking processing is processing to determine a point to which the feature point has moved with the lapse of time. The feature-point tracking device 343 supplies the result of the tracking processing to the feature-point deletion device 344.

On the basis of the tracking result received from the feature-point tracking device 343, the feature-point deletion device 344 determines an unnecessary feature point as a feature point to be deleted and deletes the feature point. The unnecessary feature point represents a movement different from a movement of a moving object such as a person or a car. The feature-point deletion device 344 sets a determination criterion, which is used for determining an unnecessary feature point, in advance. The feature-point deletion device 344 applies the determination criterion to the result of the tracking processing carried out by the feature-point tracking device 343 for a feature point in order to determine whether or not the feature point is an unnecessary feature point representing a movement different from a movement of a moving object and deletes the feature point. The feature-point deletion device 344 outputs a feature point not to be deleted to the detection determination device 345. To put it in detail, on the basis of the determination criterion, the feature-point deletion device 344 determines the unnecessary feature point as a feature point to be deleted and deletes the feature point. The determination criterion is at least one of the movement direction of the feature point, the movement velocity of the feature point, the position of the feature point and the tracking period. Then, the feature-point deletion device 344 notifies the feature-point registration device 342 of the deleted unnecessary feature point as a feature point to be deleted. Informed of the deleted unnecessary feature point, the feature-point registration device 342 also deletes the feature point from the list.

On the basis of the feature point received from the feature-point deletion device 344 as a feature point not deleted by the feature-point deletion device 344, the detection determination device 345 determines whether or not a moving object has been detected. If the taken image includes a moving object, a number of feature points are located at positions close to each other on the moving object portion of the image and the feature points move in the same direction. Thus, on the basis of the number of feature points, the post-tracking positions of the feature points and the directions of the movements of the feature points, the detection determination device 345 determines whether or not a moving object has been detected. To put it concretely, if the number of feature points located at positions close to each other is equal to or greater than a threshold value determined in advance and the feature points have moved in the same direction, the detection determination device 345 determines that a moving object has been detected and outputs the result of the determination to the detection-result processing unit 35.

Back to FIG. 3, the detection-result processing unit 35 carries out integration processing to collect moving-object detection results received from a plurality of moving-object detection processing devices which are employed in the detection processing unit 34, outputting the result of the integration processing to the transmission section 40. If any one of the moving-object detection processing devices outputs a moving object determination result indicating that a moving object has been detected for example, the detection-result processing unit 35 outputs the moving object determination result to the transmission section 40 as an integration-processing result indicating that a moving object has been detected. In addition, the detection-result processing unit 35 may also add information indicating which of the moving-object detection processing devices has detected the moving object to the moving-object detection result to form the result of the integration processing. By adding the information indicating which of the moving-object detection processing devices has detected the moving object to the moving-object detection result, it is possible to determine whether the positional distance between the detected moving-object and the moving-object detection apparatus is short, medium or long.

1-2: Moving-Object Detection Method

Next, a moving-object detection method for detecting a moving object is explained as follows. The moving-object detection processing device adopts the moving-object detection method making use of a present image and a past image. In accordance with the moving-object detection method, at a plurality of specified positions such as positions specified by the coordinate specification unit 33, the moving-object detection processing unit takes a point having a movement distance equal to or longer than a value determined in advance as a feature point. Then, the moving-object detection processing unit carries out tracking processing on the feature points. Subsequently, the moving-object detection processing unit further carries out the tracking processing on the feature points by deleting a feature point having a movement different from a movement of a moving object such as a person or a car. Typical examples of the movement different from a movement of a moving object such as a person or a car are a movement close to a vibration and a movement caused by an abrupt velocity change on one frame. A typical example of the movement close to a vibration is fluctuations of a tree. Then, the moving-object detection processing unit determines whether or not a number of feature points are moving in the same directions in order to detect a disturbance-resistant moving object.

The feature-point detection device 341 computes a motion vector for each of a plurality of positions specified by the coordinate specification unit 33 and then detects a feature point on the basis of the computed motion vector representing the movement distance of the feature point.

A method for computing a motion vector is selected from a variety of methods including a template matching method and a gradient method. The following description assumes adoption of the template matching method which is a disturbance-resistant method.

Figure 5A:
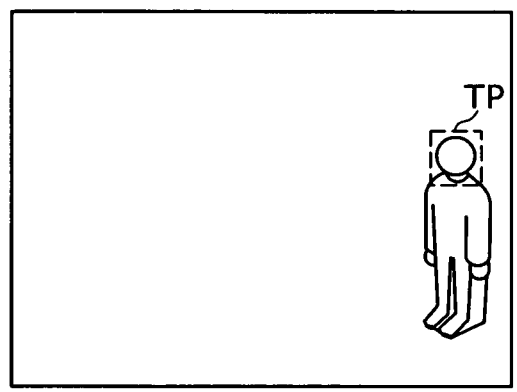
FIGS. 5A and 5B are a plurality of explanatory diagrams to be referred to in description of a template matching method used as a method for computing a motion vector.
Figure 5B:
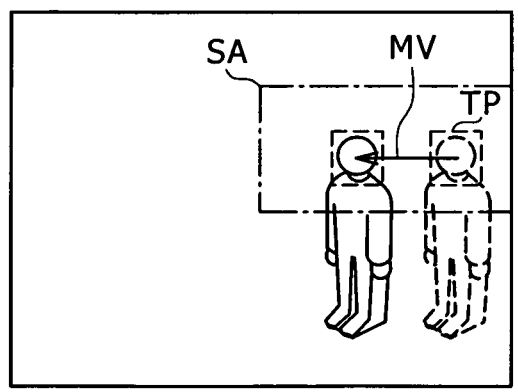

FIG. 5 is a plurality of explanatory diagrams referred to in the following description of the template matching method adopted as a method for computing a motion vector. In accordance with the template matching method, a surrounding image taking a position, the motion vector of which is to be found, as a reference is cut out as a template TP. In the case of FIG. 5A for example, the surrounding image is an image enclosed by a dashed line as an image surrounding the head. Then, a motion vector MV is computed by searching a motion-vector search area SA enclosed by a dotted dashed line in FIG. 5B for a position to which the cut out template TP has moved. In this case, if the entire screen is searched for such a position, it is quite within the bounds of possibility that another thing similar to the template TP is found. That is to say, it is quite within the bounds of possibility that an incorrect motion vector is inadvertently found or, in the case of a large motion-vector search area SA, there is raised a problem that the amount of computation undesirably increases. For these reasons, a motion-vector search area SA is generally set within a fixed range and the motion-vector search area SA is searched for the location of a thing matching the template TP.

A method for determining whether or not the thing at the location, for which the search area of the motion vector is searched, matches the template TP can be selected from a variety of proposed techniques. The proposed techniques include a technique referred to an SAD (Sum of Absolute Differences) technique and a technique referred to as a normalization mutual correlation technique. Both the SAD technique and the normalization mutual correlation technique are generally adopted typical techniques. Note that it is possible to provide a configuration in which the search area of the motion vector is searched for the location of a thing matching the template TP after the template TP itself has been converted into a feature quantity such as a histogram or a frequency.

Figure 6:
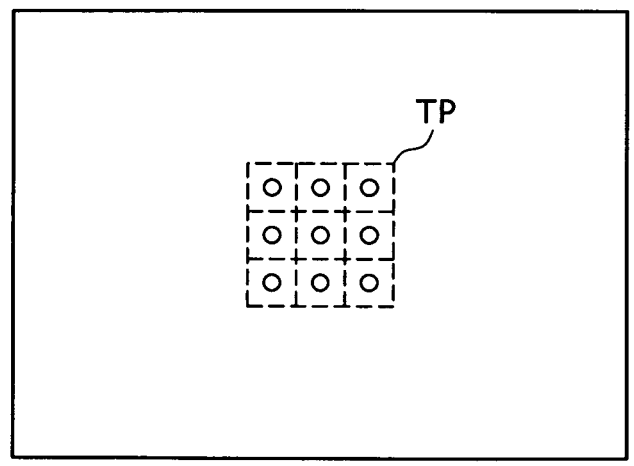
FIG. 6 is an explanatory diagram to be referred to in description of operations carried out by adoption of the template matching method.

In accordance with the template matching method, as shown in FIG. 6, the feature-point detection device 341 takes an image, which takes a position specified by the coordinate specification unit 33 as a reference, as a template TP and computes a motion vector for every template TP. In this figure, the positions specified by the coordinate specification unit 33 are positions each indicated by a white circle. It is to be noted that, in the example shown in FIG. 6, the number of positions specified by the coordinate specification unit 33 is nine, setting nine templates TP each enclosed by a dashed line.

The template TP has a proper size determined in accordance with the size of the moving object being detected and the resolution of the image of the moving object. If the moving object being detected has a small size and the image of the moving object has a low resolution for example, an excessively large template TP reduces the size of the image portion of the moving object to a very small size. With the size of the image portion of the moving object reduced to a very small size, it is feared that the feature-point detection device 341 is not capable of computing the motion vector of the moving object correctly during the template matching process in some cases. If the moving object being detected has a large size and the image of the moving object has a high resolution, on the other hand, an excessively small template TP causes the feature of the moving object to be undesirably not represented in the template TP. With the feature of the moving object not represented in the template TP, it is feared that the feature-point detection device 341 detects a plurality of images similar to the template TP during the template matching process in some cases so that the feature-point detection device 341 is not capable of computing the motion vector of the moving object correctly. Thus, with the template TP set at a proper size determined in accordance with the size of the moving object being detected and the resolution of the image of the moving object, when the moving object moves to a specified position, the feature-point detection device 341 is capable of computing the motion vector of the moving object correctly by carrying out the template matching process.

FIG. 6 shows a typical case in which a plurality of templates are provided at a contiguous location. It is to be noted, however, that a plurality of templates can also be provided at locations separated from each other.

For every template, the feature-point detection device 341 carries out a template matching process by making use of a past image in order to compute a motion vector representing a movement distance for the template. The moving-object detection processing unit 341 selects a position having a movement distance for the template equal to or longer than a value determined in advance from a plurality of specified positions and takes the selected position as a feature point which is then supplied by the feature-point detection device 341 to the feature-point registration device 342 to be registered in the feature-point registration device 342. If the movement distance for the template set for a specified position is shorter than the value determined in advance, on the other hand, the specified position is not registered as a feature point.

FIG. 7 is a plurality of diagrams showing typical feature points for a case in which a moving object OB is included in an image. It is to be noted that FIG. 7 shows a case in which the moving object OB is moving from the right-hand side of the figure to the left-hand side of the figure. In addition, in FIG. 7, a specified position is shown as a white circle whereas a specified position taken as a feature point is shown as a black circle.

As shown in FIG. 7A, at a time t0, the moving object OB has not arrived at a specified position. Thus, at the time t0, no specified position is registered as a feature point. Then, as shown in FIG. 7B, at a time t1, the moving object OB has arrived at 3 specified positions on the right-hand side of a block of specified positions. At the time t1, templates at the 3 specified positions on the right-hand side of the block of specified positions become an image of the moving object OB. Thus, each of the 3 specified positions on the right-hand side of the block of specified positions is registered as a feature point. Then, as shown in FIG. 7C, at a time t2, the moving object OB has arrived at nine specified positions. At the time t2, templates at the nine specified positions become an image of the moving object OB. Thus, each of the nine specified positions is registered as a feature point. Then, as shown in FIG. 7D, at a time t3, an image of the moving object OB is left at three specified positions on the left-hand side of a block of specified positions. At the time t3, templates at the three specified positions on the left-hand side of the block of specified positions become an image of the moving object OB. Thus, each of the three specified positions on the left-hand side of the block of specified positions is registered as a feature point. Then, as shown in FIG. 7E, at a time t4, the moving object OB has passed through the block of specified positions. At the time t4, when the moving object OB is not left in the block of specified positions, no specified position is registered as a feature point.

As described above, the feature-point detection device 341 takes a specified position as a detected feature point on the basis of the movement distance of the specified position and registers the detected feature point in the feature-point registration device 342. For example, for every frame, the feature-point detection device 341 finds a motion vector of the specified position on the present image as a vector representing the movement distance of the specified position and carries out the processing to detect a feature point on the basis of the motion vector as well as the processing to register the feature point in the feature-point registration device 342. Thus, feature points each detected for a frame are registered sequentially in the feature-point registration device 342.

Figure 8A:
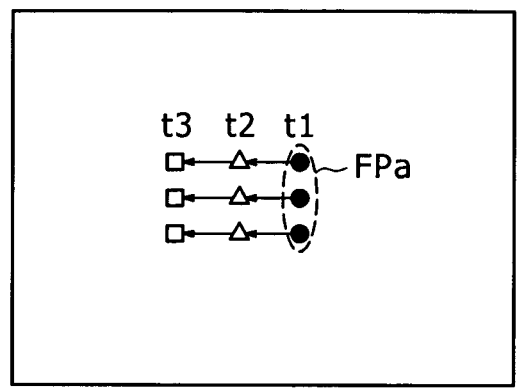
FIGS. 8A and 8B are a plurality of diagrams showing a typical tracking state of feature points.
Figure 8B:
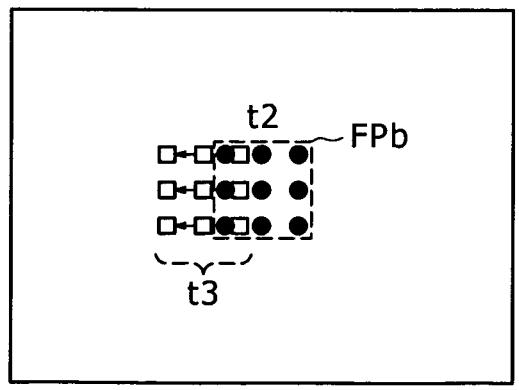

The feature-point tracking device 343 carries out tracking processing by adoption of the template matching method on the feature point registered in the feature-point registration device 342. That is to say, the feature-point tracking device 343 computes the motion vector for the feature point registered in the feature-point registration device 342. FIG. 8 is a plurality of diagrams showing a typical tracking state of feature points. As shown in FIG. 8A for example, for feature points FPa detected at a time t1, the feature-point tracking device 343 carries out tracking processing on positions at a time t2, positions at a time t3 and positions after the time t3. In FIG. 8A, the positions at the time t2 are each shown as a triangular mark whereas the positions at the time t3 are each shown as a rectangular mark. In addition, as shown in FIG. 8B for example, for feature points FPb detected at the time t2, the feature-point tracking device 343 carries out tracking processing on positions at a time t3 and positions after the time t3. In FIG. 8B, the positions at the time t3 are each shown as a rectangular mark. On top of that, as shown in none of the figures for example, for feature points detected at the time t3 and subsequent times following the time t3, the feature-point tracking device 343 carries out tracking processing on positions in the same way.

The feature-point deletion device 344 applies a detection criterion to the tracking results output by the feature-point tracking device 343 in order to determine an unnecessary feature point as a feature point to be deleted and deletes the feature point. The unnecessary feature point represents a movement different from a movement of the moving object. That is to say, the feature-point deletion device 344 determines whether or not a feature point is an unnecessary feature point by making use of at least one of the movement direction of the feature point, the movement velocity of the feature point, the position of the feature point and the tracking period as the detection criterion. For example, the feature-point deletion device 344 determines an unnecessary feature point and deletes the unnecessary feature point on the basis of a determination criterion explained below. It is to be noted that FIG. 9 is a plurality of explanatory diagrams referred to in the following description of a feature point to be deleted.

Figure 9A:
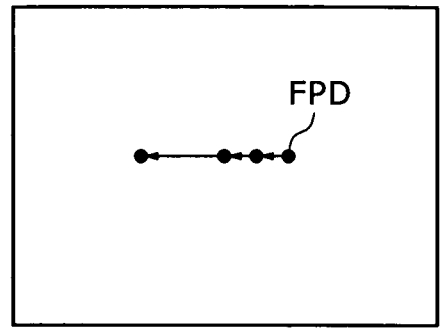
FIGS. 9A through 9C is a plurality of explanatory diagrams to be referred to in description of a feature point to be deleted.

The determination criterion used for determining a feature point to be deleted is at least one of the following:

1: Whether or not the feature point is a feature point FPD having an abruptly changing movement velocity on 1 frame as shown in FIG. 9A

Figure 9B:
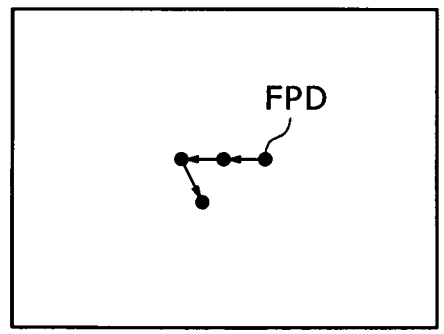

2: Whether or not the feature point is a feature point FPD having an abruptly changing movement direction as shown in FIG. 9B

Figure 9C:
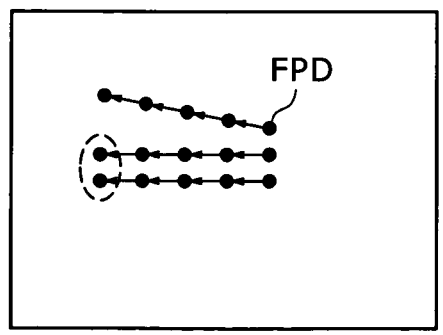

3: Whether or not the feature point is a feature point FPD separated away from another feature point by a movement distance not longer than a predetermined value as shown in FIG. 9C

In addition, if a feature point is detected and registered for every frame for example, the number of feature points registered in the feature-point registration device 342 increases so that the amount of tracking processing carried out on the registered feature points also rises undesirably as well. In order to solve this problem, the feature-point deletion device 344 handles a feature point with a tracking time period equal to or longer than a value determined in advance as a feature point to be deleted. In this way, it is possible to prevent the amount of tracking from increasing undesirably.

The feature-point deletion device 344 deletes a feature point determined as a feature point to be deleted and outputs undeleted feature points to the detection determination device 345. In addition, the feature-point deletion device 344 also requests the feature-point registration device 342 to delete a feature point, which has been deleted by the feature-point deletion device 344, from the list of feature points. In accordance with the request made by the feature-point deletion device 344, the feature-point registration device 342 deletes a feature point, which has been deleted by the feature-point deletion device 344, from the list of feature points. In this way, the feature-point deletion device 344 deletes a feature point determined as a feature point to be deleted and outputs a feature point, which most likely shows a moving object, to the detection determination device 345.

By referring to the data of feature points not deleted by the feature-point deletion device 344, the detection determination device 345 carries out passing-through determination processing. That is to say, if a moving object has passed through the observed location, a number of feature points exist at positions close to each other and the feature points move in the same movement direction. Thus, if the number of feature points existing at positions close to each other is equal to or greater than a passing-through determination threshold value determined in advance and the feature points move in the same movement direction, the detection determination device 345 determines that a moving object has been detected and outputs a passing-through determination processing result indicating the fact that the moving object has been detected. It is to be noted that, since a number of feature points output by the feature-point deletion device 344 as feature points most likely indicating a moving object exist at positions close to each other and the feature points move in the same movement direction on a plurality of frames, it is possible to provide a configuration in which the detection determination device 345 carries out passing-through determination processing by referring to data generated for the frames as the data of feature points.

A plurality of moving-object detection processing devices are set to operate differently from each other in at least one of the resolution of the present and past images, the time distance between the present and past images and the search area of the motion vector. Thus, the moving-object detection characteristics of the moving-object detection processing devices can be made different from each other in accordance with the positional distance between the moving object and the moving-object detection apparatus.

In the case of this embodiment, three moving-object detection processing devices are provided. The three moving-object detection processing devices are respectively the short-distance moving-object detection processing device 34S, the medium-distance moving-object detection processing device 34M and the long-distance moving-object detection processing device 34L which are operated typically in accordance with Table 1 given as follows.

TABLE 1

|  | Image resolution | Past image |
|---|---|---|
| Short-distance moving-object detection processing device | Low resolution | More recent image |
| Medium-distance moving-object detection processing device | High resolution | More recent image |
| Long-distance moving-object detection processing device | High resolution | Less recent image |

The short-distance moving-object detection processing device 34S detects a moving object by making use of an image having a low resolution and a more recent past image such as a past image leading ahead of the present image by typically one frame.

The medium-distance moving-object detection processing device 34M detects a moving object by making use of an image having a high resolution higher than the low resolution of the image used by the short-distance moving-object detection processing device 34S and a more recent past image such as a past image leading ahead of the present image by typically one frame. For example, the medium-distance moving-object detection processing device 34M makes use of an image having a high resolution which is twice the low resolution of the image used by the short-distance moving-object detection processing device 34S.

The long-distance moving-object detection processing device 34L detects a moving object by making use of an image having a high resolution equal to the high resolution of the image used by the medium-distance moving-object detection processing device 34M and a less recent past image such as a past image leading ahead of the present image by typically five frames.

FIG. 10 is a plurality of explanatory diagrams referred to in the following description of a case in which the positional distance between the moving object OB and the moving-object detection apparatus is a short positional distance. It is to be noted that, in the case shown in FIG. 10, a solid line indicates the moving object OB on the present image whereas a dashed line indicates the moving object OB on the past image. FIG. 10 shows a case in which a motion vector is computed by extracting the post-movement position of the moving object OB from the present image. It is to be noted that FIGS. 11 and 12 are drawn in the same way as FIG. 10.

Figure 10A:
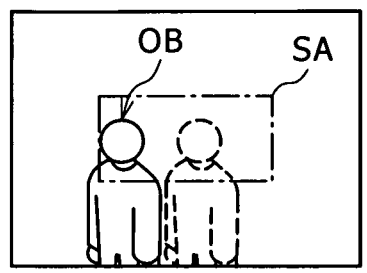
FIGS. 10A and 10B are a plurality of explanatory diagrams to be referred to in description of a case in which the positional distance between the moving object and the moving-object detection apparatus is a short positional distance.
Figure 10B:
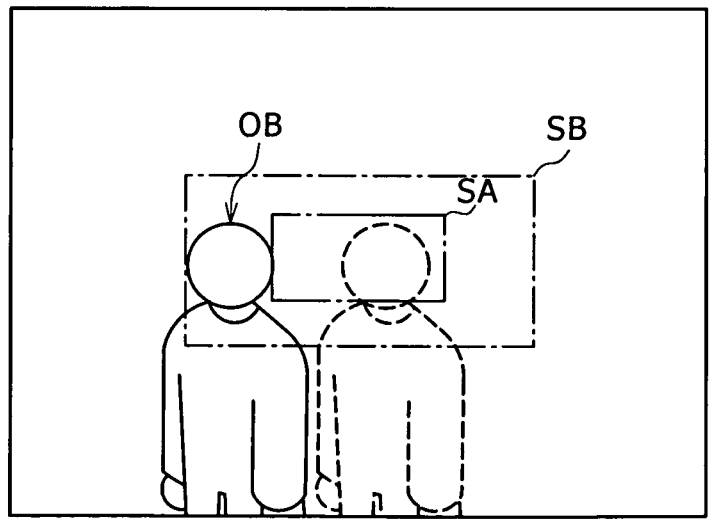

As shown in FIG. 10A, if an area SA enclosed by a single-dotted dashed line is used as a motion-vector search area SA of the template matching method for a case in which a moving object OB is detected by making use of an image having a low resolution, the moving-object detection processing device is capable of computing the motion vector of the moving object OB. As shown in FIG. 10B, if an area SA enclosed by a single-dotted dashed line as an area having a size equal to the size of the area SA shown in FIG. 10A as a motion-vector search area SA for an image having a low resolution is used as a motion-vector search area SA of the template matching method for a case in which a moving object OB is detected by making use of an image having a high resolution, however, the moving-object detection processing device is not capable of computing the motion vector of the moving object OB. That is to say, if an image having a high resolution is used, the moving-object detection processing device is not capable of computing the motion vector of the moving object OB unless the feature-point detection device 341 and/or the feature-point tracking device 343 provides a wide motion-vector search area such as an area SB enclosed by a double-dotted dashed line shown in FIG. 10B. Thus, it inevitably takes long time to compute the motion vector. In addition, if the positional distance between the moving object OB passing through the location of interest and the moving-object detection apparatus is a short positional distance, the image of the moving object OB is large in comparison with the case in which the positional distance between the moving object OB passing through the location of interest and the moving-object detection apparatus is a long positional distance. For that reason, by making use of an image having a low resolution, the short-distance moving-object detection processing device 34S detects the moving object OB separated away from the moving-object detection apparatus by a short positional distance.

Figure 11A:
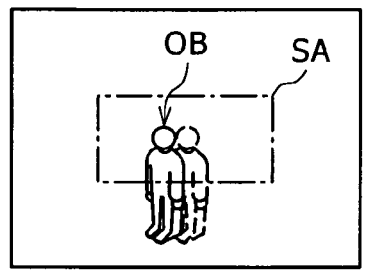
FIGS. 11A and 11B are a plurality of explanatory diagrams to be referred to in description of a case in which the positional distance between the moving object and the moving-object detection apparatus is a medium positional distance.
Figure 11B:
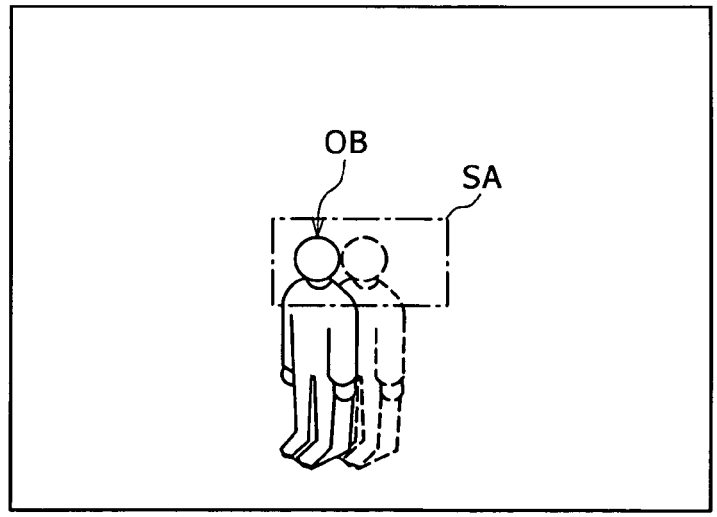

FIG. 11 is a plurality of explanatory diagrams referred to in the following description of a case in which the positional distance between the moving object OB and the moving-object detection apparatus is a medium positional distance. If a moving object OB is detected by making use of an image having a low resolution as shown in FIG. 11A, for a moving object OB existing at the medium positional distance, the movement distance between the moving object OB on the low-resolution present image and the moving object OB on the low-resolution past image is short. It is thus difficult for the moving-object detection processing device to compute the motion vector of the moving object OB with a high degree of precision. If a moving object OB is detected by making use of an image having a high resolution as shown in FIG. 11B, however, for a moving object OB existing at the medium positional distance, the movement distance between the moving object OB on the high-resolution present image and the moving object OB on the high-resolution past image is longer than the movement distance for the images each having a low resolution as shown in FIG. 11A. Thus, the moving-object detection processing device is capable of computing the motion vector of the moving object OB with a high degree of precision. For that reason, by making use of an image having a high resolution, the medium-distance moving-object detection processing device 34M detects the moving object OB separated away from the moving-object detection apparatus by a medium positional distance.

Figure 12A:
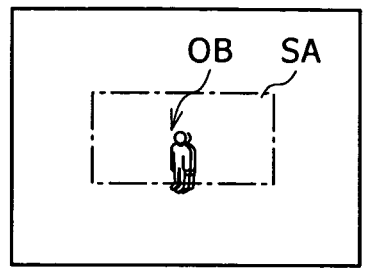
FIGS. 12A through 12C is a plurality of explanatory diagrams to be referred to in description of a case in which the positional distance between the moving object and the moving-object detection apparatus is a long positional distance.
Figure 12B:
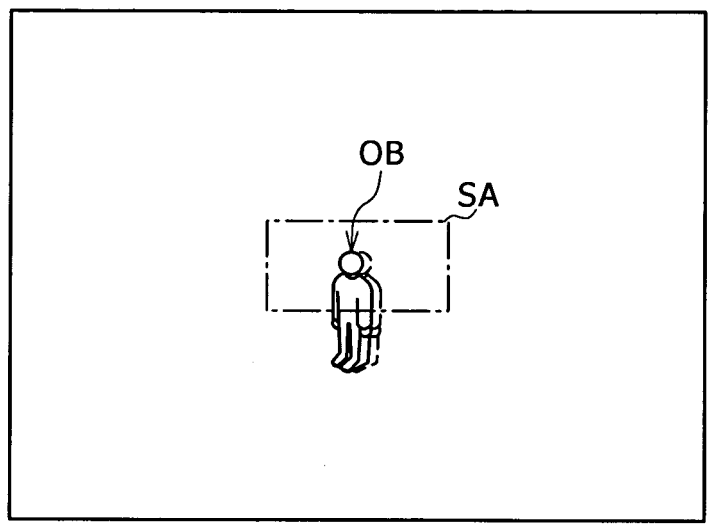
Figure 12C:
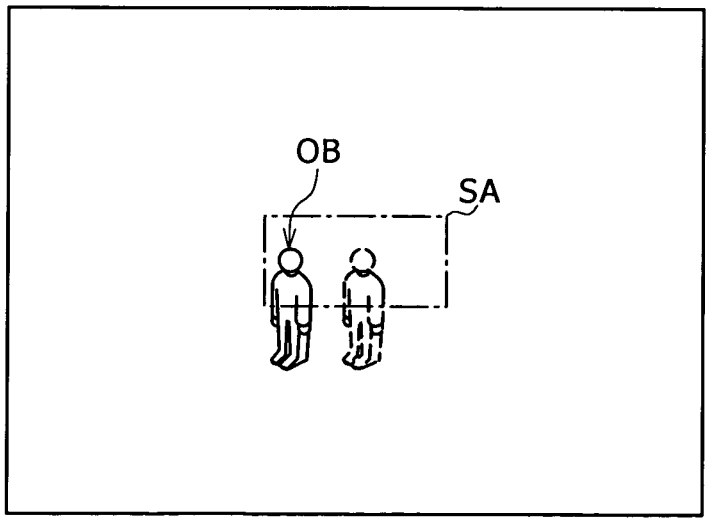

FIG. 12 is a plurality of explanatory diagrams referred to in the following description of a case in which the positional distance between the moving object OB and the moving-object detection apparatus is a long positional distance. If a moving object OB is detected by making use of an image having a low resolution as shown in FIG. 12A, for a moving object OB existing at the long positional distance, the movement distance between the moving object OB on the low-resolution present image and the moving object OB on the low-resolution past image is short. In addition, the size of the moving object OB existing at the long positional distance is small in comparison with the moving object OB existing at the medium positional distance. It is thus difficult for the moving-object detection processing device to compute the motion vector of the moving object OB with a high degree of precision. If a moving object OB is detected by making use of an image having a high resolution as shown in FIG. 12B, however, for a moving object OB existing at the long positional distance, the movement positional distance between the moving object OB on the high-resolution present image and the moving object OB on the high-resolution past image is longer than the movement distance for the images each having a low resolution as shown in FIG. 12A. Nevertheless, for a moving object OB existing at the long positional distance, the movement distance between the moving object OB on the high-resolution present image and the moving object OB on the high-resolution past image is still short. In order to solve this problem, a less recent image is used as the past image or the time distance between the present image and the past image is increased. In this way, for a moving object OB existing at the long positional distance, the movement distance between the moving object OB on the high-resolution present image and the moving object OB on the high-resolution past image can be raised as shown in FIG. 12C. Thus, the moving-object detection processing device is capable of computing the motion vector of the moving object OB with a high degree of precision. For that reason, by making use of not only an image having a high resolution but also a less recent image as the past image, the long-distance moving-object detection processing device 34L detects the moving object OB separated away from the moving-object detection apparatus by a long positional distance.

As described above, the short-distance moving-object detection processing device 34S, the medium-distance moving-object detection processing device 34M and the long-distance moving-object detection processing device 34L detect a moving object for different cases explained above. Thus, the detection processing unit 34 is capable of detecting the moving object in a stable manner with no regard to whether the positional distance between the moving object and the moving-object detection apparatus is a short, medium or long positional distance.

In addition, each of the short-distance moving-object detection processing device 34S, the medium-distance moving-object detection processing device 34M and the long-distance moving-object detection processing device 34L detects a feature point, carries out tracking processing on the detected feature point and detects the moving object on the basis of a result of the tracking processing. Thus, the moving-object detection processing device is capable of detecting the moving object in a stable manner.

As described above, in the first embodiment, the processing to detect a moving object is carried out by classifying the positional distance between the moving object and the moving-object detection apparatus into three categories, i.e., the short, medium and long positional distances. It is to be noted, however, that the positional distance between the moving object and the moving-object detection apparatus, the resolution of the image and the time distance between images can be classified into more categories such as four and five categories. By increasing the number of categories into which the positional distance between the moving object and the moving-object detection apparatus, the resolution of the image and the time distance between images are classified, the processing to detect a moving object can be carried out for a wide range of velocities at which the moving object is moving.

In addition, for a short positional distance between the moving object and the moving-object detection apparatus, the movement distance of the moving object on the image is long. For a long positional distance between the moving object and the moving-object detection apparatus, on the other hand, the movement distance of the moving object on the image is short. Thus, it is possible to provide a configuration in which the moving-object detection processing device controls the search area of the motion vector in order to provide different moving-object detection characteristics for different positional distances between the moving object and the moving-object detection apparatus.

On top of that, a plurality of moving-object detection processing devices are set to operate differently from each other in at least one of the resolution of the present and past images, the time distance between the present and past images and the search area of the motion vector. Thus, the moving-object detection processing devices are capable of detecting the moving object in a stable manner with no regard to the movement velocity of the moving object. In the case of a high movement velocity of the moving object for example, the feature point undesirably moves beyond the search range of the motion vector so that the moving-object detection processing device is inevitably incapable of carrying out the tracking processing on the feature point. If the time distance between the past and present images is shortened, however, the feature point moves within the search area of the motion vector. Thus, in this case, the moving-object detection processing device is capable of detecting the moving object on the basis of the result of the tracking processing. In the case of a low movement velocity of the moving object, on the other hand, it is difficult to compute the motion vector with a high degree of precision from an image with a low resolution. In this case, the moving-object detection processing device is thus incapable of registering the feature point and carrying out the tracking processing on the feature point in a stable manner. If an image having a high resolution is used, however, it is possible to compute the motion vector with a high degree of precision from the image with a high resolution in comparison with a case in which an image having a low resolution is used. Thus, if an image having a high resolution is used, the moving-object detection processing device is capable of registering the feature point and carrying out the tracking processing on the feature point in a stable manner. In addition, if the search area of the motion vector is widened, the moving-object detection processing device is capable of detecting a moving object moving at a high movement velocity. That is to say, since a plurality of moving-object detection processing devices are set to operate differently from each other in at least one of the resolution of the present and past images, the time distance between the present and past images and the search area of the motion vector, the moving-object detection processing devices are capable of detecting the moving object in a stable manner with no regard to the movement velocity of the moving object.

2: Second Embodiment

Next, a second embodiment is explained as follows. In the moving-object detection section 30 described above, each of the short-distance moving-object detection processing device 34S, the medium-distance moving-object detection processing device 34M and the long-distance moving-object detection processing device 34L individually detects a moving object. Thus, for example, a moving object which can be detected by the medium-distance moving-object detection processing device 34M is also detected by the short-distance moving-object detection processing device 34S. By the same token, a moving object which can be detected by the long-distance moving-object detection processing device 34L is also detected by the medium-distance moving-object detection processing device 34M. As a result, the processing to detect the same moving object is undesirably carried out by a plurality of moving-object detection processing devices in some cases. In order to solve this problem, in the case of the second embodiment, any specific moving-object detection processing device employed in a moving-object detection section 30 makes use of information set for moving-object detection processing carried out by other moving-object detection processing devices in order to reduce the number of cases in which a moving object detected by another moving-object detection processing device is redundantly detected by the specific moving-object detection processing device. Thus, a moving-object detection section 30 employed in the second embodiment is capable of detecting the moving object with a high degree of efficiency.

2-1: Other Configuration of the Moving-Object Detection Section

FIG. 13 is a block diagram showing the configuration of the moving-object detection section 30a which is another moving-object detection section. It is to be noted that, in the moving-object detection section 30a shown in FIG. 13, elements identical with their respective counterparts employed in the moving-object detection section 30 shown in FIG. 3 are denoted by the same reference numeral as the counterparts and detailed explanation is ommited.

A detection processing unit 34a employed in the moving-object detection section 30a typically employs a short-distance moving-object detection processing device 34Sa, a medium-distance moving-object detection processing device 34Ma and a long-distance moving-object detection processing device 34La. Each of the short-distance moving-object detection processing device 34Sa, the medium-distance moving-object detection processing device 34Ma and the long-distance moving-object detection processing device 34La detects a moving object by making use of an image signal stored in the past-image storage unit 32 to represent a past image and an image signal output by the signal processing section 12 (or 22) to represent a present image. The short-distance moving-object detection processing device 34Sa sets such conditions for moving-object detection that the short-distance moving-object detection processing device 34Sa is capable of detecting a moving object separated away from the moving-object detection apparatus by a short positional distance. By the same token, the long-distance moving-object detection processing device 34La sets such conditions for moving-object detection that the long-distance moving-object detection processing device 34La is capable of detecting a moving object separated away from the moving-object detection apparatus by a long positional distance. In the same way, the medium-distance moving-object detection processing device 34Ma sets such conditions for moving-object detection that the medium-distance moving-object detection processing device 34Ma is capable of detecting a moving object separated away from the moving-object detection apparatus by a medium positional distance which is a positional distance between the short positional distance of the moving object detected by the short-distance moving-object detection processing device 34Sa and the long positional distance of the moving object detected by the long-distance moving-object detection processing device 34La.

In addition, any specific one of the short-distance moving-object detection processing device 34Sa, the medium-distance moving-object detection processing device 34Ma and the long-distance moving-object detection processing device 34La makes use of information set for moving-object detection processing carried out by the other ones of the short-distance moving-object detection processing device 34Sa, the medium-distance moving-object detection processing device 34Ma and the long-distance moving-object detection processing device 34La in order to reduce the number of cases in which a moving object detected by any other one of the short-distance moving-object detection processing device 34Sa, the medium-distance moving-object detection processing device 34Ma and the long-distance moving-object detection processing device 34La is redundantly detected by the specific one of the short-distance moving-object detection processing device 34Sa, the medium-distance moving-object detection processing device 34Ma and the long-distance moving-object detection processing device 34La. The information set for moving-object detection processing typically includes information on a detectable movement, information on the search area of the motion vector search area and information on a past image.

2-2: Moving-Object Detection Method

Next, the following description explains a case in which the feature-point detection device 341 employed in any specific moving-object detection processing device makes use of information received from the other moving-object detection processing devices as information on a detectable movement. In a moving-object detection processing device making use of an image having a high resolution and a moving-object detection processing device making use of an image having a low resolution, for example, their image frame rates are equal to each other and the resolution of the image having a high resolution is twice the resolution of the image having a low resolution. In this case, processing carried out by a moving-object detection processing device to detect a moving object moving through a movement distance of N pixels on an image having a high resolution corresponds to processing carried out by a moving-object detection processing device to detect a moving object moving through a movement distance of N/2 pixels on an image having a low resolution. Thus, if a moving-object detection processing device making use of an image having a high resolution is capable of detecting a moving object moving through a movement distance of up to N pixels on the image having a high resolution, the moving-object detection processing device making use of an image having a low resolution does not register a position representing a movement distance of up to N/2 pixels as a feature point.

In this way, the number of feature points registered in the feature-point registration device 342 can be reduced so that the amount of processing carried out by the feature-point tracking device 343 can also be decreased as well.

In addition, it is also possible to provide a configuration in which the moving-object detection processing device making use of an image having a low resolution takes a movement distance shorter than N/2 pixels as a criterion and registers a position representing a movement distance longer than this criterion as a feature point. In the case of such a configuration, both the moving-object detection processing device making use of an image having a high resolution and the moving-object detection processing device making use of an image having a low resolution can redundantly carry out part of the moving-object detection processing. Thus, the moving-object detection section 30a is capable of carrying out the moving-object detection processing in a stable manner.

Figure 14A:
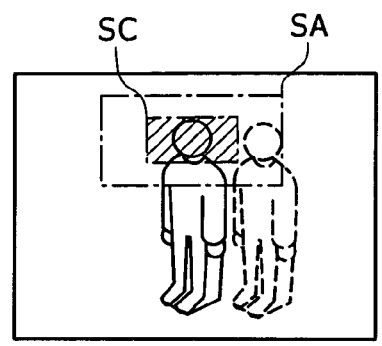
FIGS. 14A and 14B are a plurality of explanatory diagrams to be referred to in description of a case in which information showing a search area of the motion vector is used.
Figure 14B:
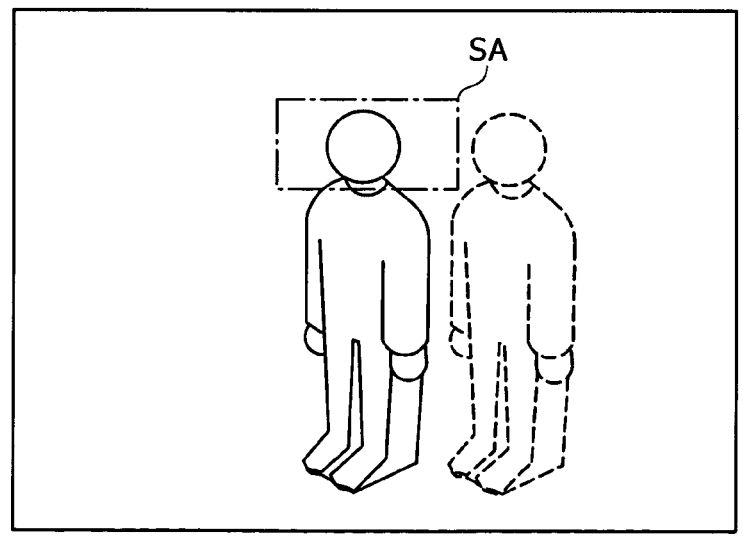

Next, by referring to FIG. 14, the following description explains a case in which the feature-point tracking device 343 employed in any specific moving-object detection processing device makes use of information received from the other moving-object detection processing devices as information on a motion-vector search area SA. In a moving-object detection processing device making use of an image having a high resolution and a moving-object detection processing device making use of an image having a low resolution, for example, their image frame rates are equal to each other and the resolution of the image having a high resolution is twice the resolution of the image having a low resolution. In addition, the motion-vector search area SA of the moving-object detection processing device making use of an image having a high resolution and the motion-vector search area SA of the moving-object detection processing device making use of an image having a low resolution are set to have a size of ((J/2)×(K/2)) pixels and a size of (J×K) pixels respectively. In this case, the motion-vector search area SA shown in FIG. 14B as the motion-vector search area SA for an image having a high resolution corresponds to a hatched block representing a motion-vector search area SC included in the motion-vector search area SA shown in FIG. 14A as the motion-vector search area SA for an image having a low resolution. That is to say, the motion-vector search area SA for an image having a medium resolution can be obtained by excluding the motion-vector search area SC corresponding to the motion-vector search area SA set to have a size of ((J/2)×(K/2)) pixels for an image having a high resolution from the motion-vector search area SA set to have a size of (J×K) pixels for an image having a low resolution. Thus, the motion-vector search area SA for an image having a medium resolution has a size of (J×K−((J/2)×(K/2))) pixels. By setting the motion-vector search areas SA in this way, the sizes of the motion-vector search areas SA can be reduced. Thus, the moving-object detection section 30a is capable of carrying out the tracking processing on a feature point at a high speed.

In addition, it is also possible to provide a configuration in which the moving-object detection processing device making use of an image having a low resolution excludes a motion-vector search area having a size smaller than the size of the motion-vector search area SC. In the case of such a configuration, both the moving-object detection processing device making use of an image having a high resolution and the moving-object detection processing device making use of an image having a low resolution can redundantly carry out part of the moving-object detection processing. Thus, the moving-object detection section 30a is capable of carrying out the moving-object detection processing in a stable manner.

Next, the following description explains a case in which the feature-point tracking device 343 employed in any specific moving-object detection processing device makes use of information received from the other moving-object detection processing devices as information on a past image. In the moving-object detection processing device making use of a more recent past image, the more recent past image is a past image leading ahead of the present image by typically H frames whereas, in the moving-object detection processing device making use of a less recent past image, the less recent past image is a past image leading ahead of the present image by typically five H frames.

In this case, with the search area of the motion vector of the less recent past image set to have a size of (J×K) pixels, the ratio of the H-frame time distance of the more recent past image to the five H-frame time distance of the less recent past image is (⅕). If a movement of (⅕) is taken into consideration, the search area of the motion vector for the less recent past image corresponds to a motion-vector search area having a size of ((J/5)×(K/5)) pixels for the more recent past image. Thus, the feature-point tracking device 343 making use of a more recent past image is required to carry out tracking processing merely in a motion-vector search area obtained by excluding a motion-vector search area having a size of ((J/5)×(K/5)) pixels from a motion-vector search area having a size of (J×K) pixels. That is to say, the feature-point tracking device 343 making use of a more recent past image is required to carry out tracking processing merely in a motion-vector search area having a size of ((J−J/5)×(K−K/5)) pixels. By setting the search area of the motion vector in this way, the size of the search area of the motion vector can be reduced.

Thus, the moving-object detection section 30a is capable of carrying out the tracking processing on a feature point at a high speed.

In addition, if the moving-object detection processing device making use of a more recent past image excludes a motion-vector search area having a size smaller than ((J/5)× (K/5)) pixels, both the moving-object detection processing device making use of a more recent past image and the moving-object detection processing device making use of a less recent past image can redundantly carry out part of the moving-object detection processing. Thus, the moving-object detection section 30a is capable of carrying out the moving-object detection processing in a stable manner.

3: Configuration for Carrying Out Software Processing for Moving-Object Detection The series of processes described previously can be carried out by hardware and/or execution of software. If the series of processes described above is carried out by execution of software, programs composing the software can be installed into a computer embedded in dedicated hardware, a general-purpose personal computer or the like from typically a network or a removable recording medium. In this case, the computer or the personal computer serves as the moving-object detection section 30 described above. A general-purpose personal computer is a personal computer, which can be made capable of carrying out a variety of functions by installing a variety of programs. In the following description, the computer and the personal computer are both referred to simply as a computer system 60 for the sake of simplicity.

Figure 15:
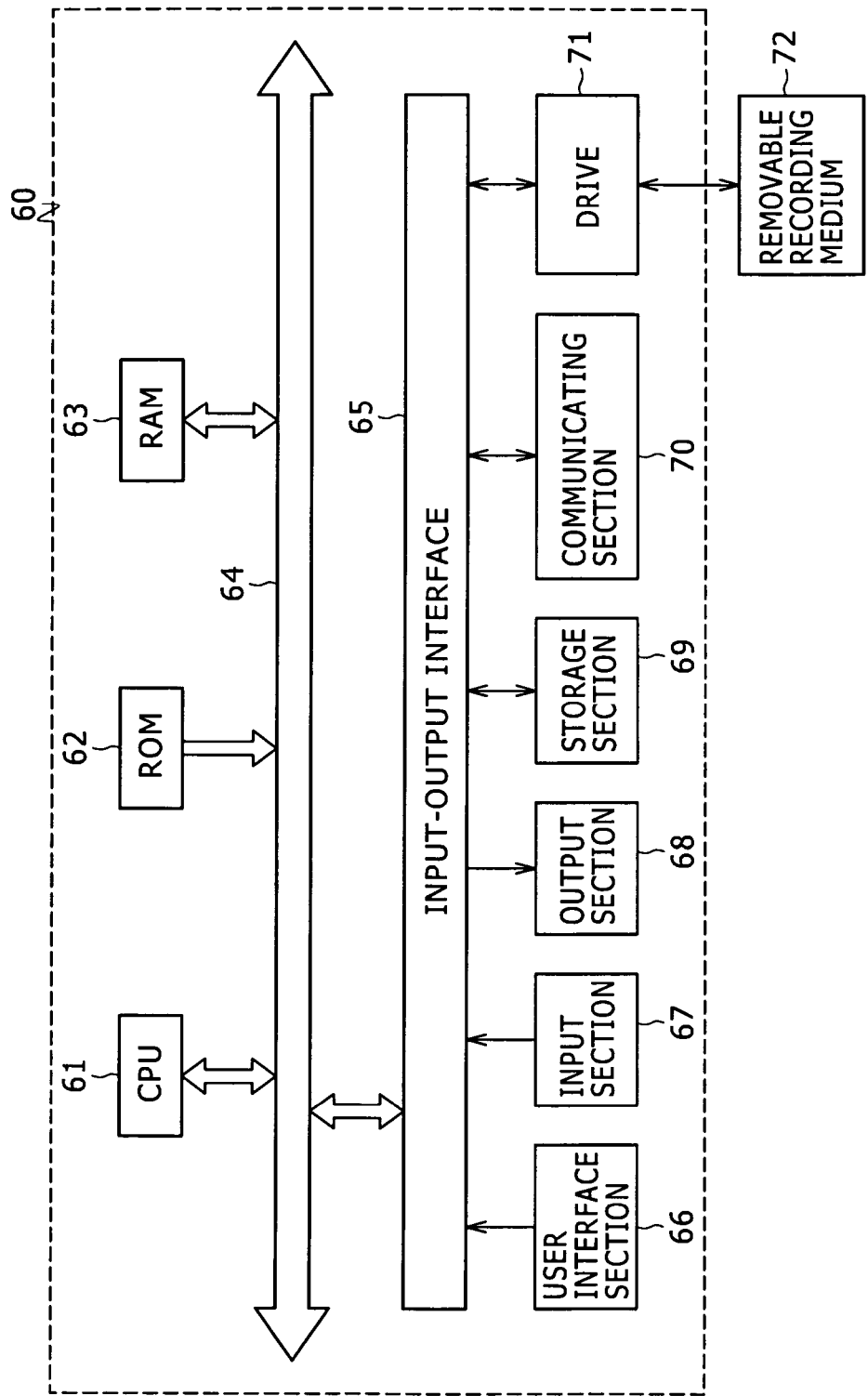
FIG. 15 is a block diagram showing a typical configuration of a computer system.

FIG. 15 is a block diagram showing a typical configuration of the computer system 60 for executing the programs in order to carry out various kinds of processing described earlier. In the computer system 60, it is a CPU (Central Processing Unit) 61 that actually executes the programs, which have been stored in advance in a ROM (Read Only Memory) 62 or a storage section 69, in order to carry out the processing.

If a program to be executed by the CPU 61 has been stored in the storage section 69, the program is loaded into a RAM (Random Access Memory) 63 prior to the execution. In addition, the RAM 63 is also used for properly storing data. The CPU 61, the ROM 62 and the RAM 63 are connected to each other by a bus 64.

In addition, the CPU 61 is connected by the bus 64 also to an input/output interface 65 which is connected to a user interface section 66, an input section 67, an output section 68, a communication section 70, a drive 71 and the storage section 69 cited above. The user interface section 66 serves as an interface with a touch panel, a keyboard and a microphone. The input section 67 receives an image signal. The output section 68 is connected to a display unit or the like. In accordance with a command received from the user interface section 66, the CPU 61 carries out the processing on the image signal received by the input section 67. Then, the CPU 61 supplies results of the processing to the output section 68.

The storage section 69 connected to the input/output interface 65 typically includes a hard disc. The storage section 69 is also used for storing various kinds of data in addition to the programs to be executed by the CPU 61. The communication section 70 communicates with external apparatus through a wire communication medium such as a network or a radio communication medium such as digital broadcasting. Typical examples of the network are the Internet and a LAN (local area network).

When a removable recording medium 72 is mounted on the drive 71, the drive 71 drives the removable recording medium 72 in order to acquire programs or data from the removable recording medium 72. If necessary, the drive 71 transfers the programs and the data to the ROM 62, the RAM 63 and/or the storage section 69.

It is to be noted that the programs are typically stored in advance in the ROM 62 and/or the hard disc employed in the storage section 69. As an alternative, the programs can also be installed into the hard disc employed in the storage section 69 from the removable recording medium 72 when the removable recording medium 72 is mounted on the drive 71 which reads out the programs from the removable recording medium 72 to be installed into the hard disc. The removable recording medium 72 is used for storing (recording) the programs temporarily or externally. Typical examples of the removable recording medium 72 are a flexible disc, a CD-ROM (Compact Disc Read Only Memory), an MO (Magneto Optical) disc, a DVD (Digital Versatile Disc), a magnetic disc and a semiconductor memory. As another alternative, the programs can also be downloaded from a download site to the computer system 60 through the wire communication medium such as a network or the radio communication medium cited before. As described above, typical examples of the network are the Internet and a LAN (local area network). In the computer system 60, the communication section 70 receives the programs downloaded from the download side and installs the programs into typically the hard disc employed in the storage section 69.

The CPU 61 executes the programs in order to drive the computer system 60 to function as a plurality of moving-object detection processing devices for detecting a moving object on the basis of a motion vector which has been computed by making use of present and past images. In addition, the moving-object detection processing devices are set to operate differently from each other in at least one of the resolution of the present and past images, the time distance between the present and past images and the search area of the motion vector. Thus, the computer system 60 is capable of detecting the moving object.

By configuring the moving-object detection processing devices as described above, on the basis of an image signal received by the input section 67 and an image signal received by the communication section 70, the moving object can be detected in a stable manner with no regard to the positional distance between the moving object and the computer system 60 as well as the movement velocity of the moving object.

It is to be noted that the descriptions given above are not to be interpreted as descriptions stating that implementations of the present invention are limited to the embodiments explained earlier as the embodiments of the present invention. For example, the position specified by the coordinate specification unit 33 is by no means limited to the center portion of the image as is the case with the typical example shown in FIG. 6. If the moving object being detected is moving in the horizontal direction for example, the position specified by the coordinate specification unit 33 can be a position on the right or left edge of the image. Each of the embodiments of the present invention is no more than a typical implementation of the present invention. That is to say, it is obvious that persons skilled in the art are capable of changing each of the embodiments of the present invention to any modified version as long as the modified version falls within a range not deviating from essentials of the present invention. In other words, the embodiments of the present invention can each be changed to any modified version provided that the modified version falls within the scope of the appended claims.

In accordance with the moving-object detection apparatus, the moving-object detection method and the moving-object detection program which are provided by the present invention, a plurality of moving-object detection processing devices detect a moving object on the basis of a motion vector which has been computed by making use of present and past images. Since the moving-object detection processing devices are set to operate differently from each other in at least one of the resolution of the present and past images, the time distance between the present and past images and the search area of the motion vector, the moving-object detection processing devices are capable of detecting the moving object. Thus, the moving-object detection characteristics of the moving-object detection processing devices can be made different from each other in accordance with the movement velocity of the moving object as well as the positional distance between the moving object and the moving-object detection apparatus. As a result, it is possible to detect the moving object in a stable manner with no regard to the movement velocity of the moving object and the positional distance between the moving object and the moving-object detection apparatus. Accordingly, the present invention is proper for equipments such as a monitoring apparatus and an intrusion detection system.

What is claimed is:

1. A moving-object detection apparatus having a plurality of moving-object detection processing devices configured to detect a moving object on the basis of a motion vector computed by making use of a present image and a past image wherein said moving-object detection processing devices are set to operate differently from each other in at least one of the resolution of said present and past images, the time distance between said present and past images and the search area of said motion vector in order to detect said moving object,
   in which the plurality of moving-object detection processing devices includes a short-distance moving-object detection processing device to detect a moving object at a first distance, a medium-distance moving-object detection processing device to detect a moving object at a second distance, and a long-distance moving-object detection processing device to detect a moving object at a third distance, and
   in which the third distance is larger than the second distance which is larger than the first distance.

2. The moving-object detection apparatus according to claim 1 wherein any specific one of said moving-object detection processing devices sets said search area of said motion vector on the basis of information set for moving-object detection processing carried out by the other ones of said moving-object detection processing devices.

3. The moving-object detection apparatus according to claim 1, said moving-object detection apparatus further having a detection-result processing section for collecting detection results produced by said moving-object detection processing devices and outputting a signal indicating that said moving object has been detected when any one of said detection results each produced by one of said moving-object detection processing devices has determined that said moving object has been detected.

4. A moving-object detection apparatus having a plurality of moving-object detection processing devices configured to detect a moving object on the basis of a motion vector computed by making use of a present image and a past image wherein said moving-object detection processing devices are set to operate differently from each other in at least one of the resolution of said present and past images, the time distance between said present and past images and the search area of said motion vector in order to detect said moving object,
   wherein each of said moving-object detection processing devices comprises:
      a feature-point detection device configured to detect a specified position with a movement distance equal to or longer than a value determined in advance among a plurality of specified positions and taking said detected specified position as a feature point;
      a feature-point tracking device configured to carry out tracking processing to determine a position to which said feature point has moved with the lapse of time;
      a feature-point deletion device configured to determine an unnecessary feature point from a result of said tracking processing, which is carried out for said feature point, by making use of a determination criterion set in advance and deleting said unnecessary feature point; and
      a detection determination device configured to determine whether or not said moving object has been detected on the basis of undeleted ones of said feature points.

5. The moving-object detection apparatus according to claim 4 wherein said feature-point deletion device determines said unnecessary feature point by making use of at least one of the movement direction of said feature point, the movement velocity of said feature point, the position of said feature point and the time period of said tracking processing carried out for said feature point.

6. The moving-object detection apparatus according to claim 4 wherein said detection determination device determines whether or not said moving object has been detected on the basis of the number of undeleted feature points, post-tracking positions of said undeleted feature points and movements directions of said undeleted feature points.

7. A moving-object detection apparatus having a plurality of moving-object detection processing devices configured to detect a moving object on the basis of a motion vector computed by making use of a present image and a past image wherein said moving-object detection processing devices are set to operate differently from each other in at least one of the resolution of said present and past images, the time distance between said present and past images and the search area of said motion vector in order to detect said moving object,
   wherein any specific one of said moving-object detection processing devices sets said search area of said motion vector on the basis of information set for moving-object detection processing carried out by the other ones of said moving-object detection processing devices, and
   wherein said specific moving-object detection processing device adjusts said search area of said motion vector on the basis of said information set for said moving-object detection processing in order to reduce the number of cases in which said moving object detected by any of said other moving-object detection processing devices is redundantly detected by said specific moving-object detection processing device.

8. A moving-object detection method provided for a plurality of moving-object detection processing devices, said moving-object detection method having moving-object detection steps each to be carried out by one of said moving-object detection processing devices to detect a moving object on the basis of a motion vector computed by making use of a present image and a past image whereby said moving-object detection processing devices are set to carry out said respective moving-object detection steps differently from each other in at least one of the resolution of said present and past images, the time distance between said present and past images and the search area of said motion vector in order to detect said moving object, in which the plurality of moving-object detection processing devices includes a short-distance moving-object detection processing device to detect a moving object at a first distance, a medium-distance moving-object detection processing device to detect a moving object at a second distance, and a long-distance moving-object detection processing device to detect a moving object at a third distance, and in which the third distance is larger than the second distance which is larger than the first distance.

9. A non-transitory computer-readable storage medium having stored thereon a moving-object detection program for driving a computer to function as a plurality of moving-object detection functional means for detecting a moving object on the basis of a motion vector computed by making use of a present image and a past image wherein said moving-object detection functional means are set to operate differently from each other in at least one of the resolution of said present and past images, the time distance between said present and past images and the search area of said motion vector in order to detect said moving object, in which the plurality of moving-object detection functional means includes a short-distance moving-object detection processing means to detect a moving object at a first distance, a medium-distance moving-object detection processing means to detect a moving object at a second distance, and a long-distance moving-object detection processing means to detect a moving object at a third distance, and in which the third distance is larger than the second distance which is larger than the first distance.

* * * * *